United States Patent [19]

Bontinck et al.

[11] 4,367,312

[45] Jan. 4, 1983

[54] HEAT-SEALABLE PACKAGING FILM PRODUCING A PEELABLE SEAL

[75] Inventors: Walter Bontinck, Sint-Martens-Leerne; Marc D'Hondt, Nazareth; Roland Jacobs, Wetteren, all of Belgium

[73] Assignee: UCB, Societe Anonyme, Saint-Gilles-lez-Bruxelles, Belgium

[21] Appl. No.: 176,245

[22] Filed: Aug. 7, 1980

[30] Foreign Application Priority Data

Aug. 8, 1979 [GB] United Kingdom ................ 7927646

[51] Int. Cl.$^3$ ............................................. C08L 53/02
[52] U.S. Cl. .................................. 525/93; 156/244.23; 264/22; 428/520; 525/98; 525/212; 525/240
[58] Field of Search ................... 525/93, 98, 222, 240; 264/22

[56] References Cited

U.S. PATENT DOCUMENTS

| | | | |
|---|---|---|---|
| 2,859,480 | 11/1958 | Berthold | 264/22 |
| 3,017,339 | 1/1962 | Dewey | 264/22 |
| 3,703,569 | 11/1972 | Wolkowicz | 264/22 |
| 3,894,117 | 7/1975 | Agouri | 525/222 |
| 4,151,159 | 4/1979 | Geall | 525/222 |

Primary Examiner—Paul R. Michl
Attorney, Agent, or Firm—Wenderoth, Lind & Ponack

[57] ABSTRACT

Heat-sealable packaging film producing a peelable seal, process for the preparation thereof and packages made therefrom or comprising such a film. This film produces such a seal on a wide range of packaging films, including polyester, polyvinyl chloride, polyamide and polyacrylonitrile films owing to:

1. its chemical composition which comprises:
   (a) 55 to 95% by weight of at least one ethylene polymer selected from polyethylene having a density of from 0.91 to 0.93 g/cm$^3$ and an ethylene-vinyl acetate copolymer containing at most 10% by weight of vinyl acetate,
   (b) 5 to 30% by weight of polystyrene, and
   (c) 0 to 20% by weight of a thermoplastic, elastomeric styrene-butadiene-styrene or styrene-isoprene-styrene block copolymer, and
2. the fact that that face of the film which is intended to form the peelable seal, has a surface tension of from 35 to 50, preferably of 37 to 45 millinewtons per meter. The film is prepared by extrusion followed by a corona discharge pretreatment of said face.

9 Claims, No Drawings

HEAT-SEALABLE PACKAGING FILM PRODUCING A PEELABLE SEAL

The present invention relates to a heat sealable packaging film which produces a peelable seal both on heat sealable films and on films which are not heat sealable, in particular on polyester, polyvinyl chloride, polyamide and polyacrylonitrile films. It also relates to a process for the preparation of the film producing a peelable seal and to packages made therefrom or comprising such a film.

At the present time, packages in the form of transparent or opaque, flexible films are finding increasing use for protecting foodstuffs, pharmaceuticals and cosmetics, toys, tools and similar articles, such as surgical instruments.

The closure of these packages is most frequently effected by heat sealing, using the heat sealability of packaging films made of polyethylene, polypropylene, varnished cellulose or the like.

However, when the closure is brought about by heat sealing together two films made from the same plastics material, for example two low-density polyethylene films, it is necessary to use tools such as scissors, knives or the like, in order to open the packages made of these films because the mechanical strength of the seals and of the packaging films is greater than the force which a person can normally exert in order to open them.

For this reason, various methods have already been proposed for manufacturing packages which have closure seals of lower mechanical strength. An ideal seal of this type must have a strength which, on the one hand, must be sufficient to keep the package intact until it is opened by the consumer but which, on the other hand, must be sufficiently weak to enable the package to be opened by hand without the use of any auxiliary instrument. Furthermore, it must be possible to effect this manual opening without producing a tear or any other deformation in the material of the films used for making the seal. Such seals are known in the packaging field as "peelable seals."

It is known to produce peelable seals by heat sealing two films made of different synthetic materials. Thus, for example, according to Belgian Pat. No. 742,694, a package is provided which is closed by a peelable seal obtained by heat sealing together a low-density polyethylene film and a polypropylene film, that face of the low-density polyethylene film which is sealed to the face of the polypropylene film having been pretreated, either by flame or by corona discharge. A disadvantage of this system is that it is restricted to the use of two specific films which are not suitable for all possible applications of packaging. Furthermore, we have observed that it is not possible to replace the polypropylene film by other packaging films, for example, polyester, polyvinyl chloride or polyamide films, because, in this case, a seal of very low strength, or even no seal at all, is obtained.

U.S. Pat. No. 3,879,492 describes a heat sealable packaging film which has the property of being able to produce a peelable seal when it is heat sealed to itself or to various packaging films, particularly to low-density or high-density polyethylene films, polypropylene films and polybutene films. The appropriate mechanical strength, which ensures the peelability of the seal, is achieved by appropriate selection of the polymer constituents forming part of the composition of the film. However, as is apparent from Example 1 of this U.S. patent specification, although it is easy to produce a peelable seal with this film on heat sealable films, such as polyethylene and polypropylene films, this is not the case with films which are not heat sealable, such as films of polyvinyl chloride, polyamide, polyester, polyacrylonitrile and the like. In order to be able to obtain a peelable seal on these latter films, it is necessary to include, in the composition of the film producing a peelable seal, a given amount of the corresponding polymer, i.e. polyamide in order to obtain a peelable seal on a polyamide film, polyvinyl chloride in the case of a polyvinyl chloride film and so forth.

Therefore, it is still of interest to find a packaging film which would make it possible to produce a peelable seal not only on heat sealable films but also, and particularly, on films which are not heat sealable, i.e. on a wide range of packaging films, including polyester, polyvinyl chloride, polyamide and polyacrylonitrile films. A film of this kind would offer a larger number of possible applications in the packaging industry.

However, this is a difficult problem in view of the fact that, with a large number of films, it is not possible to produce a seal on the above-mentioned films which are not heat sealable or it is only possible to produce a seal of insufficient mechanical strength, whereupon the packaging can easily open accidentally.

Furthermore, it is difficult to find a packaging film which produces a good peelable seal. An ideal peelable seal should meet the following requirements:

(1) its peel strength must be at least 300 g per cm of seal width and at most 750 g per cm of seal width;
(2) it must be possible to rupture the seal at the original interface of the films from which it is formed without producing a tear or any deformation in the material of one of these films; furthermore, if one of these films is laminated to other materials, simultaneous peeling of the laminate should not occur;
(3) it must be possible to rupture the seal homogeneously, i.e. without irregular deposits of the material of one of the films onto the face of the other film which has been used to form the seal;
(4) it must be possible to rupture the seal by merely pulling by hand, without using a jerking motion;
(5) it must be possible to produce the seal by heat sealing over a wide temperature range, the minimum temperature range allowable being about 20° C.; and
(6) if necessary, it must be able to withstand the temperatures and pressures used in pasteurizing and sterilizing apparatus.

The film producing a peelable seal must also possess the normal physical properties of a packaging film, such as transparency, impact strength, flexibility, tear strength, heat sealability, suitability for lamination, suitability for printing with inks and the like.

We have now discovered that it is possible to solve this problem by providing a heat sealable packaging film which produces a peelable seal satisfying the requirements mentioned above in points (1) to (6) not only on heat sealable films but also on films which are not heat sealable; this is achieved by appropriately selecting the polymer constituents of the film and also by specifically modifying the polarity of the surface of that face of the film which forms the peelable seal by heat sealing.

Thus, the present invention provides a heat sealable packaging film producing a peelable seal, comprising:

(a) 55 to 95% by weight of at least one ethylene polymer selected from polyethylene having a density of from 0.91 to 0.93 g/cm³ and an ethylene-vinyl acetate copolymer containing at most 10% by weight of vinyl acetate, (b) 5 to 30% by weight of polystyrene, and (c) 0 to 20% by weight of a thermoplastic, elastomeric styrene-butadiene-styrene or styrene-isoprene-styrene block copolymer, the face of the film which is intended to form the peelable seal having a surface tension of from 35 to 50 millinewtons per meter and preferably of from 37 to 45 millinewtons per meter.

The present invention also provides a process for the preparation of the above-described packaging film, which comprises extruding a composition comprising (a) 55 to 95% by weight of at least one ethylene polymer selected from polyethylene having a density of from 0.91 to 0.93 g/cm³ and an ethylene-vinyl acetate copolymer containing at most 10% by weight of vinyl acetate, (b) 5 to 30% by weight of polystyrene, and (c) 0 to 20% by weight of a thermoplastic, elastomeric styrene-butadiene-styrene or styrene-isoprene-styrene block copolymer, and subjecting that face of the extruded film which is intended to form the peelable seal to a corona discharge pretreatment with an intensity sufficient to confer to said face a surface tension of from 35 to 50 millinewtons per meter and preferably of from 37 to 45 millinewtons per meter.

The present invention also provides packages made from or comprising the above-described film.

Constituent (a) of the film according to the present invention is either a polyethylene having a density of from 0.91 to 0.93 g/cm³, i.e. a low-density polyethylene, or an ethylene-vinyl acetate copolymer containing at most 10% by weight and preferably 4 to 8% by weight of vinyl acetate. The values indicated for the density of polyethylene are determined in accordance with ASTM D-792 an D-1505. The amount of constituent (a) forming part of the composition of the film represents 55 to 95% by weight and preferably 65 to 85% by weight, based on the total weight of the polymers present. The strength of the seal obtained by heat sealing a film prepared exclusively from constituent (a) to itself or to certain other heat sealable films is much too high for the seal to be peelable, this strength normally being at least 800 g/cm. On the other hand, we have observed that the mechanical strength of the seal is insufficient and may even drop below 100 g/cm of seal width on polyester, polyvinyl chloride, polyamide or polyacrylonitrile films, even if that face of the film prepared exclusively from constituent (a) and which is intended to form the seal is pretreated by corona discharge.

Constituent (b) of the film is a homopolymer of styrene. Its presence is essential in the composition of the film according to the present invention in an amount of from 5 to 30% by weight and preferably of from 10 to 20% by weight, based on the total weight of the polymers present. This constituent acts indeed on the peelability of the seal.

Constituent (c) of the film is a thermoplastic, elastomeric, styrene-butadiene-styrene or styrene-isoprene-styrene block copolymer. These block copolymers preferably contain from 15 to 40% by weight of styrene units and 60 to 85% by weight of butadiene or isoprene units.

Constituent (c) is not absolutely necessary in the film according to the invention. However it improves the mutual compatibility of constituents (a) and (b), which results in a better homogenization and an improved extrudability of the composition. Therefore, this constituent allows the production of a film with improved mechanical properties. Furthermore, this constituent acts very favorably on the qualities of the peelable seals obtained. For this reason, the composition of the film according to the invention advantageously contains up to 20% by weight, preferably from 5 to 15% by weight of constituent (c), based on the total weight of the polymers present.

However, a film prepared from constituents (a), (b) and even (c) does not produce peelable seals on polyester, polyvinyl chloride, polyamide or polyacrylonitrile films. In fact, as shown in Examples 1 and 3 hereinafter, the values of the strength of the seals obtained are below 100 g/cm of seal width.

Surprisingly, we have found that by subjecting that face of the film which is intended to form the seal to a corona discharge pretreatment of a given intensity, it is possible to obtain excellent peelable seals which meet the requirements mentioned above in points (1) to (6), not only on the same film and on other heat sealable packaging films but also on packaging films which are not heat sealable and in particular on polyester, polyvinyl chloride, polyamide and polyacrylonitrile films. This result is astonishing and entirely unexpected.

The pretreatment used for preparing the film according to the present invention is preferably the corona discharge treatment currently used in the art for the purpose of rendering the surfaces of films of polyethylene and of other plastics materials receptive to printing inks or of rendering them suitable for lamination onto other films. According to the present invention, it is applied to that face of the film which is intended to form the peelable seal and which will be in contact with the face of the other film used for this purpose. Furthermore, the intensity of this pretreatment must be selected so that the face of the film intended to form the peelable seal has a surface tension of from 35 to 50 millinewtons per meter and preferably of from 37 to 45 millinewtons per meter. In fact, a film which possesses the chemical composition of a film according to the present invention, but which has not been subjected to any pretreatment, generally has a surface tension of about 32 millinewtons per meter. It is for this reason that it must be pretreated by corona discharge with a sufficient intensity for that face of the film which is intended to form the peelable seal to have a surface tension of from 35 to 50 millinewtons per meter.

If the surface tension is lower than 35 millinewtons per meter, the mechanical strength of the seal formed, for example on a polyvinyl chloride or polyester film, is insufficient to ensure the tightness of the package until it is opened by the consumer. On the other hand, there is no advantage in exceeding a surface tension of 50 millinewtons per meter because, in order to achieve higher surface tensions, it would be necessary to apply a pretreatment of such a high intensity that the operation would become economically unacceptable and there would be the additional risk of damaging the film. That face of the film which is intended to form the seal must, therefore, have a surface tension within the above-mentioned range in order to obtain a mechanical strength which ensures the peelability of the seal formed on a polyvinyl chloride, polyester, polyamide or polyacrylonitrile film.

It is well known in the art that the intensity of corona discharge treatment depends, in particular on the wattage input into the electrode pair, the speed of film travel, the thickness of the film and the distance between the electrodes. The above-mentioned parameters can, therefore, be adjusted so as to obtain the critical intensity which produces the desired surface tensions.

To prepare the film according to the present invention, the polymer constituents (a), (b) and (c) are preferably used in the form of powders or granules.

The composition of the film producing a peelable seal according to the present invention can be composed exclusively of the above-mentioned constituents (a), (b) and possibly (c) but it can also comprise the fillers and/or adjuvants which are commonly used in the manufacture of packaging films.

Fillers can be added, for example, to make the film opaque and/or to impart additional hardness thereto. Representative examples of fillers which can be added include talc, titanium dioxide, kaolin, zeolites, silica, micronized mica, zinc oxide, aluminum oxide, natural or precipitated calcium carbonate, magnesium carbonate, barytine and the like. These fillers are used in the form of powders having a particle size which must not be greater than 50 micrometers and they can be added to the composition of the film in amounts varying from 0% to about 10% by weight, based on the total weight of the polymer constituents (a), (b) and (c).

The adjuvants which can be used include heat-stabilizers, for example, diphenylthiourea, alpha-phenylindole, barium, cadmium and/or zinc palmitate and/or stearate, tris-nonylphenyl phosphite and the like; antioxidants, for example 4,4'-thio-bis-(6-tert.butyl-m-cresol), 4,4'-methylene-bis-(2,6-di-tert.butyl-phenol), hydroxytoluenes containing butyl groups and the like; optical bleaching agents, for example sulfonated derivatives of stilbene; organic dyestuffs, for example phthalocyanins, azo dyestuffs, chloroindanthrenes and the like; inorganic pigments, for example zinc chromate, cadmium sulfide and iron oxide; antistatic agents and lubricants, such as magnesium stearate, calcium stearate, paraffin oil and the like. These adjuvants can be added to the composition of the film in an amount of from 0 to about 5% by weight, based on the total weight of the polymer constituents (a), (b) and (c).

To manufacture the film with a peelable seal according to the present invention, the polymers and, if appropriate, the fillers and the adjuvants are homogenized with one another at ambient temperature in a mixer of conventional construction and preferably of the normal rotary type.

An appropriate method of homogenizing this mixture is to introduce the polymers into the mixer, together with a lubricant, such as paraffin oil, and then to add the fillers and the pulverulent adjuvants to the homogenized mixture thus obtained.

Another procedure is to prepare master batches with at least one of the polymers, the fillers and the adjuvants and then to homogenize the master batches together with the remaining polymers.

The homogeneous mixture thus obtained is extruded in an apparatus of conventional design, in which the mixture is heated to a temperature of at most 290° C.

The extruder can comprise one or more extrusion screws; it is only important at this stage that the composition obtained is homogeneous at the outlet of the die.

As is well known, the mechanical properties can be further modified, depending upon whether the extrusion takes place through a slit-die or by the blow extrusion technique. In this latter case, the cooling rate and the blowing rate can also be modified as desired.

At the outlet of the extruder, that face of the film obtained which is intended to form the peelable seal is subjected to a corona discharge pretreatment with an intensity which is such that the surface tension of that face is from 35 to 50 millinewtons per meter and preferably of from 37 to 45 millinewtons per meter.

The film thus obtained can be used as such as a packaging material. However, it is preferably used in the form of a laminate with one or more other films of plastics material of various nature or with paper, aluminum foils or the like. To form these laminates, use is made of the well-known lamination techniques, such as adhesive lamination, extrusion lamination or coextrusion.

Before carrying out the lamination, it is also possible, if necessary, to pretreat by flame or by corona discharge that face of the film according to the present invention which is opposite the face intended to form the peelable seal in order to improve, in known manner, the adhesion of the film to the other materials with which it is laminated.

It should be noted however that in the case where the film according to the present invention is used in the form of a laminate with other materials, it is not absolutely necessary for that face of the film which is intended to form the peelable seal to be pretreated before being laminated to the other materials. In this case, it is, of course, possible first to prepare, for example by coextrusion, a laminate composed of a first film having the chemical composition of a film according to the present invention and of one or more other films of a different nature and then to pretreat, by corona discharge, that face of the first film which is intended to form the peelable seal in order to confer to this face the surface tension which is necessary to ensure the peelability of the seal.

The following Examples are given for the purpose of illustrating the present invention. In these Examples, the films subjected to the tests are used in the form of a laminate with a polyester film. The same results can, of course, be obtained with single non-laminated films or with films laminated onto other materials. In these Examples, an apparatus of the Multivac type is used to produce the seals by heat sealing. The values of the peel strength are measured, in accordance with conventional methods, with an electronic tensile testing apparatus; the values indicated for the melt index (M.I.) of the polymers are determined in accordance with ASTM D-1238 and expressed in grams of polymer extruded in the course of 10 minutes at a temperature of 190° C. The surface tension is measured in accordance with the RC 359 method described in TAPPI (53, June 1970, No. 6, pages 1165–1166).

EXAMPLE 1

This Example shows that the corona discharge pretreatment of the film according to the present invention is absolutely necessary in order to obtain a peelable seal on a polyvinyl chloride film.

A 50 μm thick film consisting of 90% by weight of a polyethylene having a density of 0.923 g/cm$^3$ and a melt index of 0.3 (Lacqtène 1003 FE of AQUITAINE-ORGANICO) and 10% by weight of a crystal-clear polystyrene having a melt index of 0.6 (Lacqrène 126B of AQUITAINE-ORGANICO) is prepared by blow extrusion. This film has a surface tension (T) of 32 mN/m.

That face of the film which is intended to form the seal is then subjected to pretreatment by a corona discharge created between an electrode and a grounded roller in order to impart a surface tension of 40 mN/m to this face. A 12 μm thick polyester film is then laminated in known manner to the other face of the film.

Another laminate is also prepared from the same 12 μm thick polyester film and the film as prepared above but that face of the latter film which is intended to form the seal is not pretreated.

Using samples of the two laminates prepared in this way, seals are then produced by heat sealing by placing the face of the film prepared above (which face may or may not be pretreated, depending on the case) in contact with a 150 μm thick, rigid polyvinyl chloride film and the forces required to cause the seals, formed at different sealing temperatures to peel apart (peel strength in grams per centimeter of seal width) are measured (sealing pressure = 13.8 N/cm$^2$; sealing time = 1 second).

The results obtained are given in Table I below:

TABLE I

| | Peel strength (g/cm) | | | | | |
|---|---|---|---|---|---|---|
| Untreated film (T = 32 mN/m) | <100 | <100 | <100 | <100 | <100 | <100 |
| Treated film (T = 40 mN/m) | 400 | 650 | 660 | 710 | 750 | 750 |
| Sealing temperature (°C.) | 140 | 150 | 160 | 170 | 180 | 190 |

This Table clearly shows that, with a film which has not been subjected to a pretreatment by corona discharge, seals are obtained on a polyvinyl chloride film, the mechanical strength of which is totally insufficient (<100 g/cm). On the other hand, if that face of the film which is intended to form the seal has been subjected to a corona discharge pretreatment of an intensity which is such that the surface tension of this face is increased from 32 to 40 millinewtons per meter, excellent peelable seals are obtained on the polyvinyl chloride film by heat sealing at sealing temperatures in the range of from 140° C. to 190° C.

EXAMPLE 2

This Example shows that the composition of the film according to the present invention must contain at least the polymer constituents (a) and (b) in order to ensure the production of a peelable seal on a polyvinyl chloride, polyester and polyamide film. It also shows that it is possible to achieve excellent peelable seals when the composition of the film also contains a polymer constituent (c).

(a) A film made exclusively of a polyethylene having a density of 0.923 g/cm$^3$ and a melt index of 0.3 (Lacqtène 1003 FE) is prepared by blow extrusion. This film has a surface tension of 29 mN/m. That face of the film which is intended to form the seal is subjected to a corona discharge pretreatment. A low-density polyethylene film, the treated face of which possesses a surface tension of 40 mN/m, is thus obtained. This film is referred to below as "film A."

(b) A film having the composition described in Example 1 (90% by weight of polyethylene and 10% by weight of polystyrene) is also prepared by blow extrusion and is subjected to the same corona discharge pretreatment so that the face of the film which is intended to form the seal has a surface tension of 40 mN/m. This film is referred to below as "film B."

(c) A film consisting of 65% by weight of a polyethylene having a density of 0.923 g/cm$^3$ and a melt index of 0.3 (Lacqtène 1003 FE), 20% by weight of a crystal-clear polystyrene having a melt index of 0.6 (Lacqrène 126B) and 15% by weight of a styrene-butadiene-styrene block copolymer containing 70% by weight of butadiene units and 30% by weight of styrene units and having a melt index of 0.5 (Solprene 416 of PHILLIPS PETROLEUM C°) is also prepared by blow extrusion. That face of this film which is intended to form the seal is also subjected to a corona discharge pretreatment. A surface tension of 38 mN/m is thus imparted to this face. This film is referred to below as "film C."

(d) A film consisting of 65% by weight of a polyethylene having a density of 0.923 g/cm$^3$ and a melt index of 0.3 (Lacqtène 1003 FE), 18% by weight of a crystal-clear polystyrene, having a melt index of 0.6 (Lacqrene 126B) and 15% by weight of a styrene-isoprene-styrene block copolymer, containing 85% by weight of isoprene units and 15% by weight of styrene units and having a melt index of 0.5 (Solprene 423 of PHILLIPS PETROLEUM C°) is also prepared by blow extrusion. This film is pretreated in the same manner as the preceding films in order to impart to that face which is intended to form the seal a surface tension of 38 mN/m. This film is referred to below as "film D."

Films A, B, C and D thus obtained, each have a thickness of 50 μm.

A 12 μm thick polyester film is laminated in known manner to that face of each of the films A, B, C and D which is opposite the face pretreated as described above.

Tests similar to those described in Example 1 are carried out in order to determine the peel strength of the heat seals formed at different temperatures with the films A, B, C and D on the following films:
- a 150 μm thick, rigid polyvinyl chloride film;
- a 100 μm thick, rigid copolyester film (Lustro of KODAK C°);
- a 40 μm thick, polyamide 6 film.

Table II shows the results obtained with the seals formed with film A, which is not according to the present invention; Table III shows the results obtained with the seals formed with film B according to the present invention; Table IV shows the results obtained with the seals formed with film C according to the present invention and Table V shows the results obtained with the seals formed with film D according to the present invention.

TABLE II

| Film A (T = 40 mN/m) | | | |
|---|---|---|---|
| Seals formed on a film of | Peel strength (g/cm) | | |
| polyvinyl chloride | <100 | <100 | <100 |
| polyester | <100 | <100 | <100 |
| polyamide 6 | <100 | <100 | <100 |
| Sealing temperature (°C.) | 140 | 160 | 180 |

TABLE III

| | Film B (T = 40 mN/m) | | | | | |
|---|---|---|---|---|---|---|
| Seals formed on a film of | Peel strength (g/cm) | | | | | |
| polyvinyl chloride | 400 | 650 | 660 | 710 | 750 | 750 |
| Sealing temperature (°C.) | 140 | 150 | 160 | 170 | 180 | 190 |

TABLE IV

| | Film C (T = 38 mN/m) | | | | | |
|---|---|---|---|---|---|---|
| Seals formed on a film of | Peel strength (g/cm) | | | | | |
| polyester | 250 | 270 | 340 | 360 | 360 | 350 |
| polyamide 6 | 400 | 450 | 450 | 450 | 455 | 460 |
| Sealing temperature (°C.) | 130 | 140 | 150 | 160 | 170 | 180 |

TABLE V

| | Film D (T = 38 mN/m) | | | | | | |
|---|---|---|---|---|---|---|---|
| Seals formed on a film of | Peel strength (g/cm) | | | | | | |
| polyvinyl chloride | 380 | 390 | 400 | 440 | 450 | 495 | 490 |
| Sealing temperature (°C.) | 130 | 140 | 150 | 160 | 170 | 180 | 190 |

These Tables show that (a) film A, made exclusively of low-density polyethylene, only produces seals of totally insufficient mechanical strength, although the face which is intended to form the seal has a surface tension of 40 millinewtons per meter, (b) on the contrary, films B, C and D according to the present invention produce, on films of polyvinyl chloride, polyester and polyamide excellent peelable seals over a wide range of sealing temperatures from 130° up to 190° C.

EXAMPLE 3

In this Example, the intensity of the corona discharge pretreatment is varied and its influence on the mechanical strength of the seals formed respectively on a polyvinyl chloride and on a polyester film is studied.

A 50 μm thick film consisting of 67% by weight of polyethylene having a density of 0.923 g/cm³ and a melt index of 0.3 (Lacqtène 1003 FE), 18% by weight of a crystal-clear polystyrene having a melt index of 0.6 (Lacqrène 126B) and 15% by weight of a styrene-butadiene-styrene block copolymer containing 70% by weight of butadiene units and 30% by weight of styrene units and having a melt index of 0.5 (Solprene 416) is prepared by blow extrusion. This film has a surface tension (T) of 32 mN/m.

The film is cut into 4 pieces.

One of these pieces is laminated to a 12 μm thick polyester film (=untreated film).

One face of each of the other three pieces is subjected to a corona discharge pretreatment with a different intensity; an identical polyester film is laminated on the other face.

Four laminates are thus obtained, one face of which is constituted by a film prepared as above and which has a surface tension respectively of 32 mN/m (untreated film), 35, 37 and 45 mN/m.

On samples of these four laminates, tests similar to those described in Example 1 are carried out in order to determine the peel strength of the heat seals formed at different temperatures, on the one hand, on a 150 μm thick rigid polyvinyl chloride film and, on the other hand, on a 100 μm thick poly(ethylene terephthalate) film (Melinex of I.C.I.).

Table VI shows the results obtained with the seals formed on the polyvinyl chloride film, whereas Table VII shows the results obtained with the seals formed on the polyester film.

TABLE VI

| | Seals made on polyvinyl chloride film. | | | | | | | | |
|---|---|---|---|---|---|---|---|---|---|
| Surface tension (T) of the face used to form the seal (mN/m) | Peel strength (g/cm) | | | | | | | | |
| 32 | — | — | <100 | <100 | <100 | <100 | <100 | <100 | <100 |
| 35 | 100 | 260 | 271 | 290 | 292 | 300 | 314 | 320 | 316 |
| 37 | 300 | 306 | 336 | 350 | 390 | 400 | 413 | 417 | 420 |
| 45 | 310 | 340 | 365 | 370 | 410 | 410 | 425 | 420 | 450 |
| Sealing temperature (°C.) | 120 | 130 | 140 | 150 | 160 | 170 | 180 | 190 | 200 |

TABLE VII

| | Seals made on polyester film. | | | | | | | | |
|---|---|---|---|---|---|---|---|---|---|
| Surface tension (T) of the face used to form the seal (mN/m) | Peel strength (g/cm) | | | | | | | | |
| 32 | — | — | <100 | <100 | <100 | <100 | <100 | <100 | <100 |
| 35 | — | 120 | 260 | 300 | 289 | 310 | 321 | 332 | 360 |
| 37 | 260 | 270 | 320 | 328 | 370 | 390 | 400 | 410 | 412 |
| 45 | 353 | 342 | 377 | 397 | 393 | 408 | 432 | 425 | 456 |
| Sealing temperature (°C.) | 120 | 130 | 140 | 150 | 160 | 170 | 180 | 190 | 200 |

These Tables show that:

(a) that face of the film which is intended to form the seal must have a surface tension of at least 35 millinewtons per meter in order to obtain a peelable seal, the mechanical strength of which is sufficient (peel strength of 300 g/cm or more) in order to ensure a tight closure of the package;

(b) when the surface tension is 35 millinewtons per meter, it is required however to carry out the sealing at temperatures in the range of from 170° to 200° C. in order to obtain a sufficient mechanical strength of the peelable seals;

(c) from a surface tension of 37 millinewtons per meter onwards, excellent peelable seals are obtained over a wide range of sealing temperatures starting from 120°

C. up to 200° C., which is the range currently used on conventional industrial packaging machinery;

(d) an increase of the surface tension brings about an increase of the mechanical strength of the peelable seals.

EXAMPLE 4

In this Example, the composition of the film producing a peelable seal contains an ethylene-vinyl acetate copolymer as constituent (a).

(a) a 50 μm thick film (called "film E" hereinafter) consisting of 67% by weight of an ethylene-vinyl acetate copolymer containing 4% by weight of vinyl acetate and having a melt index of 0.5 (Baylon V 18 E 464 of BAYER A. G.), 18% by weight of crystal-clear polystyrene having a melt index of 0.6 (Lacqrène 126B) and 15% by weight of a styrene-butadiene-styrene block copolymer containing 70% by weight of butadiene units and 30% by weight of styrene units (Solprene 416) is prepared by blow extrusion. This film is passed through a corona discharge treatment device in such a way that the surface tension of one of its faces is 38 mN/m. This face of the film is used to form the seals. A 12 μm thick polyester film is laminated, in known manner, to the other face of the film.

(b) there is proceeded as in (a) except that the 50 μm thick film consists exclusively of an ethylene-vinyl acetate copolymer (Baylon V 18 E 464). This film is called hereinafter "Film F."

Tests similar to those described in Example 1 are carried out in order to determine the peel strength of the heat seals formed at different temperatures, on the one hand, on a 150 μm thick rigid polyvinyl chloride film and, on the other hand, on a 150 μm thick polyacrylonitrile film (Barex of STANDARD OIL C°).

Table VIII shows the results obtained with seals formed with film E according to the invention, whereas Table IX gives the results obtained with seals formed with film F not according to the invention.

TABLE VIII

| Seals formed on a film of | Film E (T = 38 mN/m) Peel strength (g/cm) | | | | | |
|---|---|---|---|---|---|---|
| polyvinyl chloride | 340 | 370 | 410 | 410 | 420 | — |
| polyacrylonitrile | 240 | 290 | 302 | 310 | 315 | 315 |
| Sealing temperature (°C.) | 140 | 150 | 160 | 170 | 180 | 190 |

TABLE IX

| Seals formed on a film of | Film F (T = 38 mN/m) Peel strength (g/cm) | | | | | | |
|---|---|---|---|---|---|---|---|
| polyvinyl chloride | 220 | 260 | 270 | 290 | 290 | 300 | 320 |
| Sealing temperature (°C.) | 140 | 150 | 160 | 170 | 180 | 190 | 200 |

These Tables show that:

(a) Film E according to the invention produces excellent peelable seals both on films of polyvinyl chloride and on films of polyacrylonitrile; however, on polyacrylonitrile films, higher sealing temperatures must be used (160° to 190° C.) in order to obtain sufficient mechanical strength of the seals (a peel strength of 300 g/cm or more);

(b) Film F (not according to the invention), containing only constituent (a), produces seals with insufficient strength, in spite of a surface tension of 38 millinewtons per meter of the face which is intended to form the seal. The peel strength indeed exceeds 300 g/cm only when the sealing temperature lies between 190° and 200° C. This temperature interval is however far too narrow to obtain reliable seals in practice. In order to obtain sufficiently strong seals, it would indeed be necessary to have a constant and very close control of the sealing temperature, which is practically impossible with the present conventional industrial packaging machinery.

It should be noted that in this Example, the polyacrylonitrile film used is made from a mixture of an acrylonitrile-methyl acrylate copolymer with an elastomeric acrylonitrile-butadiene copolymer (Barex). However, similar results are obtained with films made from other acrylonitrile polymers such as the film sold under the trade name Lopac by MONSANTO CHEMICAL C° or Cycopac by BORG WARNER, both being prepared from acrylonitrile-styrene copolymers.

EXAMPLE 5

This Example shows that a film according to the present invention is able to produce peelable seals on a wide range of packaging films.

The 50 μm thick film subjected to the tests consists of 70% by weight of a polyethylene having a density of 0.923 g/cm$^3$ and a melt index of 0.3 (Lacqtène 1003 FE), 15% by weight of a crystal-clear polystyrene having a melt index of 0.6 (Lacqrène 126B) and 15% by weight of a styrene-butadiene-styrene block copolymer containing 70% by weight of butadiene units and 30% by weight of styrene units and having a melt index of 0.5 (Solprene 416).

That face of this film which is intended to form the seal is subjected to a corona discharge pretreatment so that this face has a surface tension of 40 mN/m and to the other face a 12 μm thick polyester film is laminated in known manner.

Using samples of the laminate prepared in this way, tests similar to those described in Example 1 are carried out in order to determine the peel strength of the heat seals formed at different temperatures on different films of plastics material (sealing pressure = 13.8 N/cm$^2$; sealing time = 1 second).

The results obtained are summarized in the following Table X:

TABLE X

| Seals formed on a film of | Peel strength (g/cm) | | | | | | |
|---|---|---|---|---|---|---|---|
| polyethylene (d = 0.918 g/cm$^3$; M.I. = 2) (thickness: 50 μm) | — | 220 | 250 | 280 | 300 | 320 | 350 |
| rigid polyvinyl chloride (thickness: 150 μm) | 370 | 420 | 430 | 450 | 490 | 500 | 530 |
| polyester (thickness: 100 μm) | 300 | 400 | 400 | 420 | 450 | 500 | 500 |
| polyamide 6 (thickness: 40 μm) | — | 400 | 450 | 450 | 450 | 450 | — |
| polypropylene (M.I. = 6) (thickness: 75 μm) | — | 450 | 400 | 500 | 480 | 500 | 540 |
| Sealing temperature (°C.) | 120 | 130 | 140 | 150 | 160 | 170 | 180 |

This Table shows that it is easy to form peelable seals with the film according to the present invention at different sealing temperatures and on a great variety of packaging films.

It should also be noted that the sealing pressure and the sealing time are not critical. In fact, it is possible to produce peelable seals on varying the sealing pressure from 13.8 N/cm² to 41.4 N/cm² and the sealing time from 0.5 second to 2 seconds, the sealing time being inversely proportional to the sealing pressure.

Examples of packages which can be produced with the film according to the present invention include:

1. packages intended for ready-made meals which can be re-heated in microwave ovens, which packages consist, on the one hand, of a lower part in the form of a tray, made of approximately 400 micrometer thick strong cardboard covered with a 20 micrometer thick poly(ethylene terephthalate) film and, on the other hand, of a cover composed of a 40 micrometer thick polyamide film laminated on a film according to the present invention. For the latter, it is advantageous to use the film prepared in Example 5, which produces an excellent peelable seal by heat sealing when its pretreated face is placed in contact with the poly(ethylene terephthalate) film of the lower part;

2. packages for medical items, such as syringes, which must be sterilized by gamma ray irradiation, which packages consist, on the one hand, of an approximately 100 micrometer thick film of a rigid copolyester (Kodar A 150 of KODAK C°) and, on the other hand, of a covering film composed of a 12 micrometer thick, biaxially oriented poly(ethylene terephthalate) film laminated on a film according to the present invention. For the latter, it is also advantageous to use the film prepared in Example 5, which produces a perfect peelable seal by heat sealing when its pretreated face is placed in contact with the rigid copolyester film; and 3. packages of various foodstuffs, such as biscuits, which packages consist, on the one hand, of 150 micrometer thick, rigid polyvinyl chloride film and, on the other hand, of a film according to the present invention, which is laminated to a 32 micrometer thick film of regenerated cellulose, varnished with polyvinylidene chloride. The transparent film of Example 1, the pretreated face of which produces a perfect peelable seal with the rigid polyvinyl chloride film, is preferably chosen as the film according to the present invention.

We claim:

1. A heat sealable packaging film producing a peelable seal comprising polymer constituents consisting essentially of
   (a) 55 to 95% by weight of at least one ethylene polymer selected from polyethylene having a density of from 0.91 to 0.93 g/cm³ and an ethylene-vinyl acetate copolymer containing at most 10% by weight of vinyl acetate,
   (b) 5 to 30% by weight of polystyrene, and
   (c) 5 to 20% by weight of a thermoplastic, elastomeric styrene-butadiene-styrene or styrene-isoprene-styrene block copolymer, the face of the film which is intended to form the peelable seal having a surface tension of from 35 to 50 millinewtons per meter.

2. A packaging film according to claim 1, wherein the face of the film which is intended to form the peelable seal has a surface tension of from 37 to 45 millinewtons per meter.

3. A packaging film according to claim 1, wherein the amount of constituent (a) represents 65 to 85% by weight, the amount of constituent (b) represents 10 to 20% by weight and the amount of constituent (c) represents 5 to 15% by weight, based on the total weight of the polymers present.

4. A packaging film according to claim 1, which additionally contains up to 10% by weight of mineral fillers and up to about 5% by weight of adjuvants conventional for packaging films, based on the total weight of the polymer constituents (a), (b) and (c).

5. A process for the preparation of a heat sealable packaging film producing a peelable seal, which comprises extruding a composition comprising polymer constituents consisting essentially of
   (a) 55 to 95% by weight of at least one ethylene polymer selected from polyethylene having a density of from 0.91 to 0.93 g/cm³ and an ethylene-vinyl acetate copolymer containing at most 10% by weight of vinyl acetate,
   (b) 5 to 30% by weight of polystyrene, and
   (c) 5 to 20% by weight of a thermoplastic, elastomeric styrene-butadiene-styrene or styrene-isoprene-styrene block polymer and subjecting that face of the extruded film which is intended to form the peelable seal to a corona discharge pretreatment with an intensity sufficient to confer to said face a surface tension of from 35 to 50 millinewtons per meter.

6. A process according to claim 5, wherein the face of the film which is intended to form the peelable seal is subjected to a corona discharge pretreatment with an intensity sufficient to confer to said face a surface tension of from 37 to 45 millinewtons per meter.

7. A process according to claim 5, wherein the amount of constituent (a) represents 65 to 85% by weight, the amount of constituent (b) represents 10 to 20% by weight and the amount of constituent (c) represents 5 to 15% by weight, based on the total weight of the polymers present.

8. A process according to claim 5, wherein the composition subjected to extrusion contains up to 10% by weight of mineral fillers and up to about 5% by weight of adjuvants conventional for packaging films, based on the total weight of the polymer constituents (a), (b) and (c).

9. A package made from or comprising a film according to claim 1.

* * * * *